United States Patent
Miller et al.

(10) Patent No.: US 8,365,428 B2
(45) Date of Patent: Feb. 5, 2013

(54) HOLE GRIP LENGTH MEASUREMENT APPARATUS

(75) Inventors: Russell L. Miller, Fort Worth, TX (US); Rick A. Luepke, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 51 days.

(21) Appl. No.: 12/968,716

(22) Filed: Dec. 15, 2010

(65) Prior Publication Data

US 2012/0151788 A1 Jun. 21, 2012

(51) Int. Cl.
  *G01B 5/02* (2006.01)
  *G01B 5/12* (2006.01)
  *G01B 3/22* (2006.01)
(52) U.S. Cl. ............ 33/542; 33/544; 33/544.5; 33/836
(58) Field of Classification Search ............ 33/542, 33/544, 544.5, 836
  See application file for complete search history.

(56) References Cited

U.S. PATENT DOCUMENTS

| | | | |
|---|---|---|---|
| 2,849,801 A * | 9/1958 | Kustusch | 33/542 |
| 3,823,484 A | 7/1974 | Dunn | |
| 4,033,043 A * | 7/1977 | Cunningham | 33/806 |
| 4,070,120 A | 1/1978 | Bald et al. | |
| 4,112,355 A * | 9/1978 | Gibson et al. | 324/662 |
| 4,216,585 A * | 8/1980 | Hatter | 33/836 |
| 4,237,612 A | 12/1980 | Christian et al. | |
| 4,377,850 A | 3/1983 | Simpson | |
| 4,731,935 A | 3/1988 | Struble | |
| 4,872,269 A * | 10/1989 | Sattmann | 33/552 |
| 4,876,800 A | 10/1989 | Pekar et al. | |
| 4,892,449 A | 1/1990 | Croxton | |
| 5,095,638 A | 3/1992 | David et al. | |
| 5,497,560 A * | 3/1996 | Pasquerella et al. | 33/836 |
| 6,637,123 B2 * | 10/2003 | Rucha et al. | 33/544.5 |
| 7,065,897 B2 * | 6/2006 | Luner et al. | 33/836 |
| 7,596,846 B2 | 10/2009 | Hoeckelman | |
| 2010/0005676 A1* | 1/2010 | Fujikawa et al. | 33/542 |

* cited by examiner

*Primary Examiner* — Christopher Fulton
(74) *Attorney, Agent, or Firm* — Reising Ethington P.C.; John J. Snyder (57) ABSTRACT

A system for determining the grip length of a hole extending through a stack of panels so that a fastener of appropriate length can be selected for insertion into the hole. A shaft carrying an array of probes is inserted into the hole and the array generates signals indicating which probes of the array are contacting an inner wall of the hole.

18 Claims, 5 Drawing Sheets

HOLE GRIP LENGTH MEASUREMENT APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to an apparatus for determining the grip length of a hole that extends through a stack of panels so that a suitable fastener can be selected for insertion into the hole.

2. Description of the Related Art Including Information Disclosed Under 37 CFR 1.97 and 1.98

Known fastener grip length measurement systems include a clamping or "grip gun" type measurement device that includes a fixed hook-like probe carried on a distal end of a shaft extending from a handle. A sliding probe is supported on the handle for reciprocal motion generally parallel to and along the shaft in opposition to the fixed probe. The fixed probe is inserted through a hole to be measured, e.g., a hole extending through a stack of two or more panels, and is engaged against a far, opposite-facing surface of the panel stack. The sliding probe is then clamped against a near surface of the panel stack, sandwiching the panel stack between the two probes. The space between the two probes is then measured by an encoder that generates and sends a corresponding signal to electronic circuitry that calculates a desired grip length for a fastener to be selected for the hole. The electronic circuitry then sends a corresponding grip length reading to a remote device such as a 3D optical projection system. The 3D optical projection system associates the grip length reading with the location of the hole and can subsequently direct that an appropriately sized fastener be mounted in the hole in that location.

Ball plungers are known for use as position sensors that generate a confirmation signal when the ball of a ball plunger sensor carried by one object is driven out of or into a ball detent carried by a second object. Contact sensor-type ball plungers are known to include a ball carried within a generally cylindrical sleeve or canister that has an opening at one end and a ball retainer detent or forward stop adjacent the opening. A spring is generally disposed between the ball and a closed end of the sleeve in a position to bias the ball toward the opening and into a position against the forward stop with a portion of the ball protruding through the opening. A signal output sensor is carried by the sleeve in a position to sense ball depression.

SUMMARY OF THE DISCLOSURE

An apparatus is provided for determining the grip length of a hole extending through a stack of panels. The apparatus includes a shaft configured to be inserted into a hole to be measured, and an array of probes spaced along the shaft. Each probe of the array may be configured to sense contact with an inner wall of a hole to be measured, and the array may be configured to generate one or more signals indicating which probes of the array are contacting an inner wall of a hole into which the shaft has been inserted. Such signals may then be used to determining the length of at least a portion of a hole extending through a panel or a stack of panels. This allows a fastener of appropriate length to be selected for insertion into the hole and for engagement with the engagement portion of the hole. It also allows for a grip length reading to be obtained after a single insertion motion and without having to "bottom out" the shaft, and neglects the length of countersinks.

The probes may be spaced around the shaft and may extend radially outward from the shaft a distance sufficient to maintain one another in contact with an inner wall of a hole to be measured and to maintain the shaft coaxially centered within a hole to be measured. The shaft and probe array may be sized diametrically to contact and bias outward against an inner wall of a hole to be measured. This allows for more precise measurements because the grip length measurement is taken along a line more closely parallel to a central axis of the hole.

Each probe may comprise a ball plunger that may each include a ball carried by a ball receptacle configured to support generally radial reciprocal motion of the ball relative to a central longitudinal axis of the shaft between an extended position against an outer stop where at least a portion of the ball protrudes radially outwardly from an outer wall of the shaft. Each probe may also comprise a biasing element configured to bias the ball radially outwardly toward the extended position. The probes may each also include a ball engagement detector configured to detect depression or radially inward movement of the ball from the extended position and to generate a corresponding signal.

The probes may be spaced apart axially along the shaft by a distance less than or equal to an incremental length difference of fasteners to be used. This allows the probe array to detect grip length differences equal to differences in the lengths of fasteners to be used without incorporating more sensors than necessary.

The apparatus may include a controller configured to calculate the grip length of a hole in response to signals received from the probes and to generate a corresponding grip length measurement signal. A transmitter may be connected to the controller and configured to transmit the grip length measurement signal to a remote device for use by the remote device in directing the placement of an appropriately sized fastener in the panel stack hole. The transmitter may be a wireless transmitter to obviate the need for a wired connection to the remote device.

The controller may be configured to measure the grip length of a hole by ascertaining which probes are contacting an inner wall of a hole to be measured, and may be programmed to do this by ascertaining the distance between a forward edge of a near-side stop surface of the apparatus and the farthest probe contacting an inner wall of the hole. This allows a single grip length measurement apparatus to be used to measure the grip length of a hole that has no nut plate or other far-end obstruction present.

Alternatively, or in addition, the near-side stop surface of the apparatus may be shaped and positioned to engage a countersink of a hole to be measured, all the probes of the probe array may be disposed forward of the near-side stop surface, and the controller may be programmed to calculate grip length as the distance along the shaft between such a near-side stop surface and the farthest detector actuated. The shaft may thus be inserted into a hole to be measured until the near-side stop surface engages the floor of a countersink of a hole to be measured, and the depth of the countersink will be neglected in the grip length measurement.

In addition, or as a further alternative, the controller may be configured to determine the grip length of a hole by ascertaining the distance between a distal forward end of the shaft and the farthest probe contacting an inner wall of the hole. This allows grip length measurements to be made in situations where the distal forward end of the shaft is blocked from passing beyond a far end of the hole to be measured by an obstruction such as a nut plate.

In addition, or as yet another alternative, the controller may be configured to determine the grip length of a hole by ascertaining the distance between the farthest-spaced probes contacting an inner wall of a hole. This allows a single grip length measurement apparatus to be used to measure the grip length of a hole regardless of the presence of a far-end obstruction, such as a nut plate, or the presence of a countersink, and regardless of whether a distal end of the shaft or a near-side stop surface of the apparatus is engaged against a facing surface of a plate stack through which extends the hole to be measured.

Also, a method is provided for determining the grip length of a hole extending through a stack of panels. According to this method a shaft is provided carrying an array of probes spaced along a length of the shaft and/or around a circumference of the shaft, with each probe of the array being configured to sense contact with an inner wall of a hole to be measured, and with the array being configured to generate one or more signals indicating which probes of the array are contacting an inner wall of a hole into which the shaft has been inserted. The shaft is inserted into a hole to be measured, and a grip length of the hole is calculated in response to signals received from the array. A fastener having the calculated grip length may then be selected to within a predetermined acceptable tolerance.

In calculating a grip length of the hole, the distance between a forward edge of a near-side stop surface of the apparatus and the farthest forward probe that's contacting an inner wall of the hole may be electronically noted. Alternatively, the distance between a distal forward end of the shaft and the farthest aft probe that's contacting an inner wall of the hole may be electronically noted. As a further alternative, what may be electronically noted is the distance between whichever two probes are axially spaced the farthest from one another the farthest from one another and are contacting an inner wall of the hole.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION OF INVENTION EMBODIMENT(S)

Figure 3:
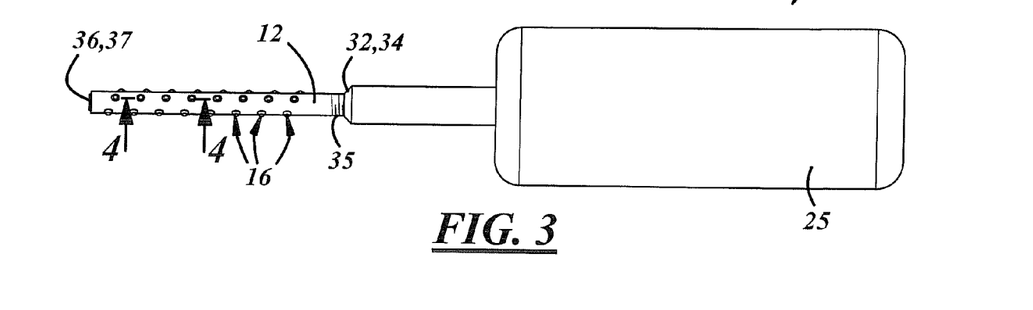
FIG. 3 is a side view of the apparatus of FIG. 1.
Figure 4:
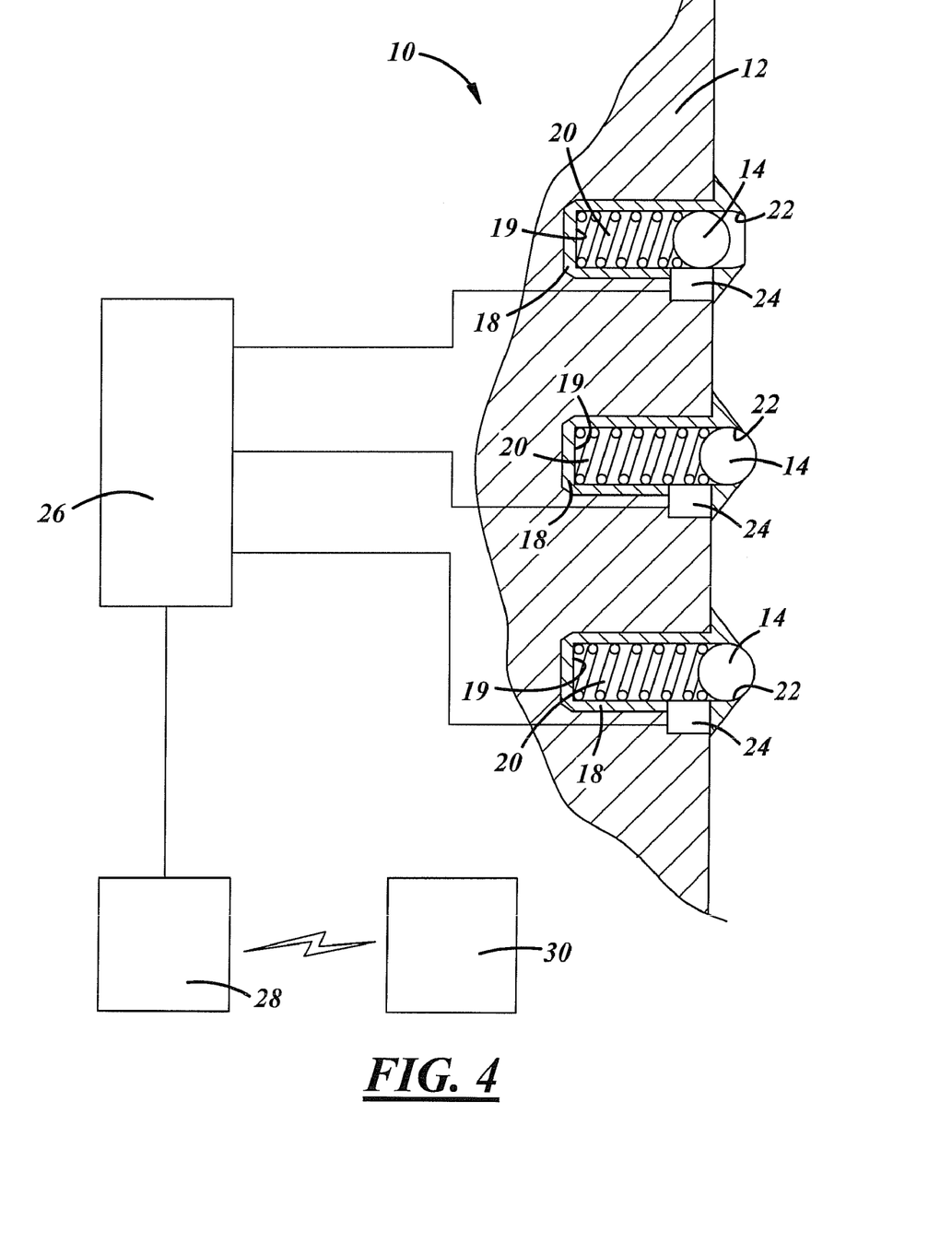
FIG. 4 is a schematic partial cross-sectional view of the apparatus of FIG. 1 taken along line 4-4 of FIG. 3 with ball plunger sensors of the apparatus shown connected to a controller that is connected to a transmitter that is in wireless communication with a remote device.
Figure 5:
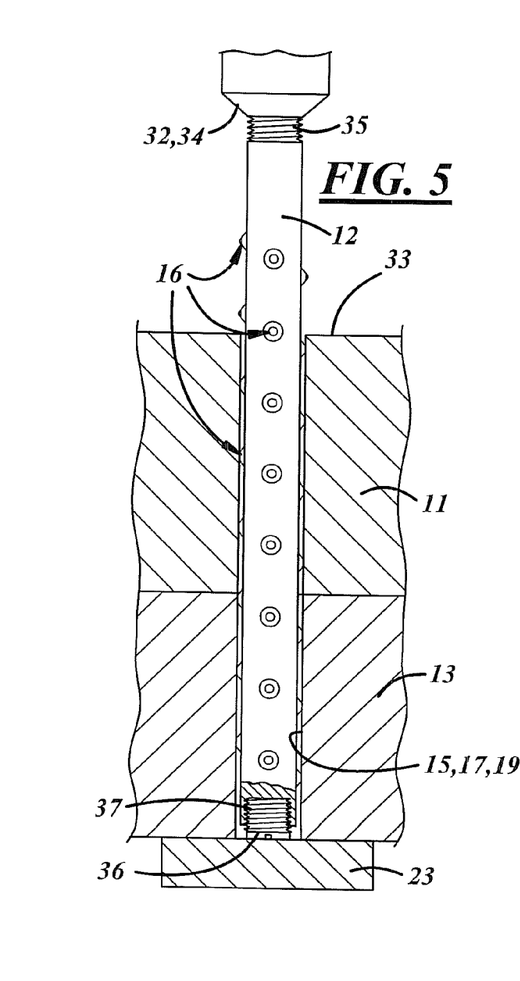
FIG. 5 is a magnified view of a shaft and sensor array of the apparatus of FIG. 1 shown inserted into a hole and with a distal tip of the shaft shown engaged against an obstruction on a far side of the hole.
Figure 6:
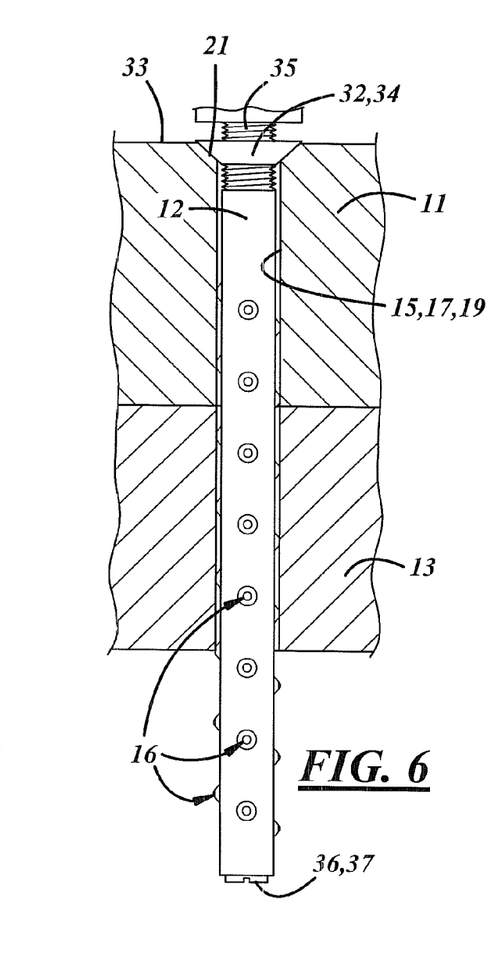
FIG. 6 is a magnified view of a shaft and sensor array of the apparatus of FIG. 1 shown inserted into a hole and with a forward stop surface of the apparatus shown engaged within a countersink of the hole.
Figure 7:
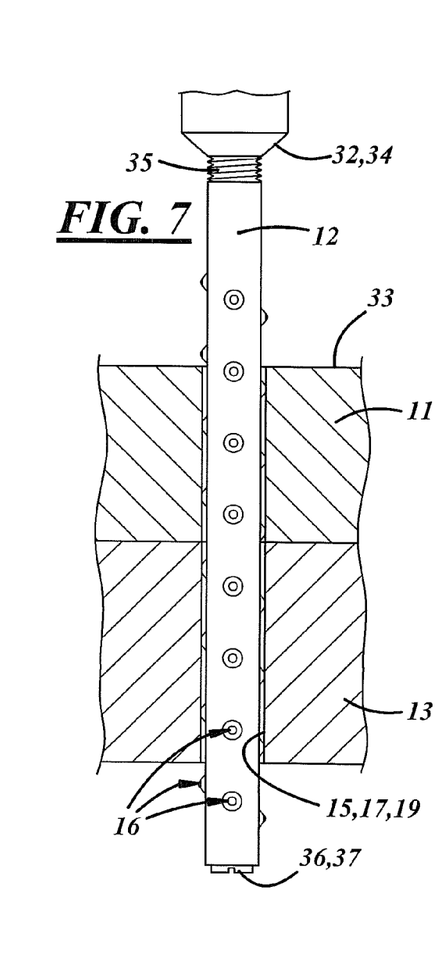
FIG. 7 is a magnified view of a shaft and sensor array of the apparatus of FIG. 1 shown inserted into a hole and with neither the distal tip of the shaft or the forward stop surface engaged.

A hole grip length measurement apparatus for determining the grip length of a hole extending through a stack of panels is generally shown at 10 in FIGS. 1-7. The apparatus 10 includes a shaft 12 that may be carried by a handle 25 and, as shown in FIG. 5-7, is configured to be inserted into a hole 15 to be measured. The apparatus 10 may also include an array of probes 16 spaced along and around an outer circumference of the shaft 12. Each probe 16 of the array may be configured to sense contact with an inner wall 17 of a hole 15 to be measured, as shown in FIGS. 5-7. The array of probes 16 may be configured to generate one or more electrical signals indicating which probes of the array are contacting an inner wall of a hole 15 into which the shaft 12 has been inserted. The array of probes 16 may signal which probes are in contact by transmitting "contact" signals from whichever probes 16 are in contact and/or by transmitting "no-contact" signals from whichever probes are not in contact, as shown in FIGS. 5-7. Such signals may then be used to determine the length of at least a portion of the hole 15 extending through a panel or a stack of panels 11, 13, e.g., an "engagement" portion 19 of the hole 15 configured and intended for engagement by a fastener. This allows a fastener of appropriate length to be selected for insertion into the hole 15 and for engagement with the engagement portion 19 of the hole 15. A grip length reading, i.e., a reading of the length of the engagement portion 19 of the hole 15, may be obtained after a single insertion motion of the apparatus 10, without having to "bottom out" the shaft 12 and neglecting the depth of any countersinks 21 that might be formed around the hole 15.

Figures 1, 2:
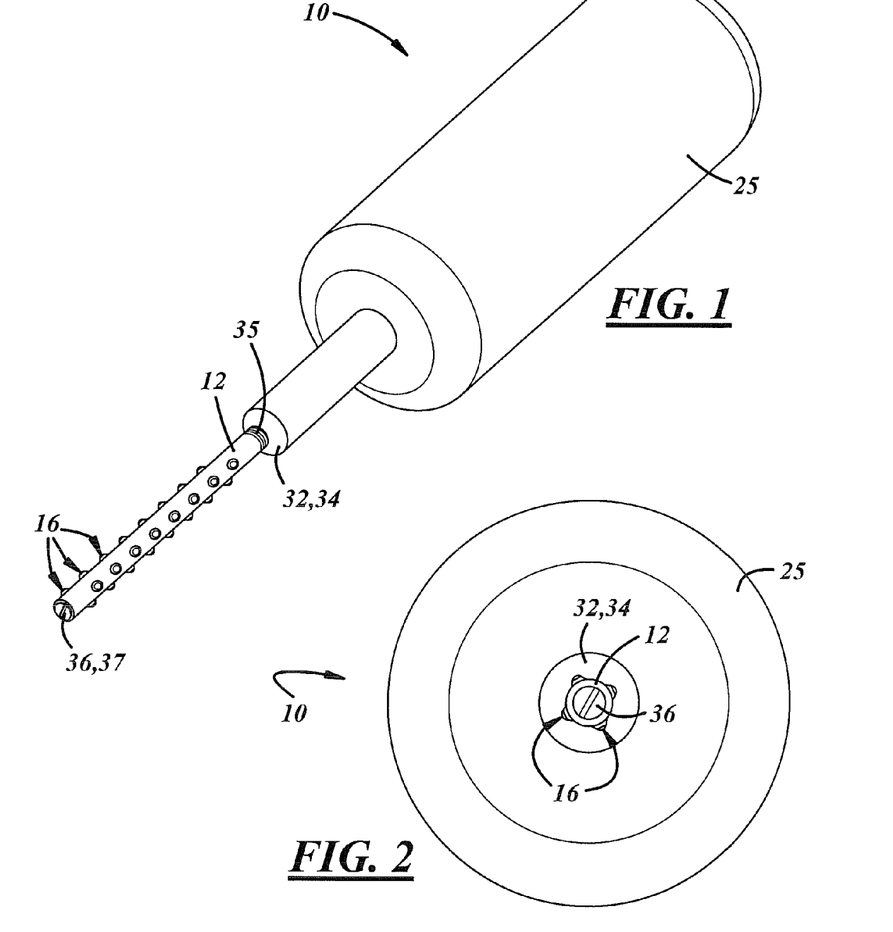
FIG. 1 is an orthogonal view of an embodiment of a hole grip length measurement apparatus.
FIG. 2 is a front end view of the apparatus of FIG. 1.

As best shown by FIGS. 1-3, the probes 16 may be spaced around the outer circumference of the shaft 12 and may extend radially outward from the shaft 12 a distance sufficient to maintain one another in contact with the inner wall 17 of an engagement portion 19 of the hole 15 to be measured, and to maintain the shaft 12 coaxially centered within the hole to be measured. In other words, the probe 16 array may be arranged in such a way as to suspend and positively position the shaft 12 coaxially within the hole 15. The shaft 12 and probe 16 array may be sized diametrically to contact and bias outwardly against an inner wall 17 of an engagement portion 19 of the hole 15 to be measured to allow for more precise measurements. More precise measurements are possible when the shaft 12 and probes 16 are configured to affirmatively position the shaft 12 coaxially within the hole 15 because it allows the grip length measurement to be taken along a line more closely parallel to a central axis of the hole 15.

The probes 16 may be spaced apart axially along the shaft 12 by a distance less than or equal to an incremental length difference of fasteners to be used. This enables the probe array to detect grip length differences generally equal to differences in the lengths of fasteners to be used, without incorporating more probes 16 than necessary. In the present embodiment, the probes 16 may be spaced apart axially along the shaft 12 by $1/16$ inch so that a selection can be made amongst fasteners having grip lengths varying in increments of 1/16 inch. In other embodiments, the probes 16 may be spaced apart in increments of one or more millimeters, or by any other suitable increments.

As best shown in FIG. 4, the probes 16 may comprise ball plungers that include balls 14 spring-mounted in ball races or generally cylindrical ball receptacles 18 that may comprise sleeves press fit, threaded, or installed by any other suitable means into holes formed in the shaft 12. Alternatively, the ball receptacles 18 may be formed as integral parts of the shaft 12. In other words, the ball receptacles 18 may be defined by holes drilled into the shaft 12 or formed or machined into the shaft 12 in any suitable manner The ball 14 and or receptacle 18 portions of the ball plunger probes 16 may comprise steel, Delrin® and/or any other suitable material.

As shown in FIG. 4, the ball 14 of each ball plunger probe 16 may be generally spherical and may be carried and supported for reciprocal axial motion within a corresponding one of the ball receptacles 18. The ball receptacle 18 of each ball plunger probe 16 may be configured to support generally radial reciprocal motion of the ball 14 relative to a central longitudinal axis of the shaft 12 between an extended position against an outer stop 22 (with at least a portion of the ball 14 protruding radially outwardly), and depressed position. As is also shown in FIG. 4, the outer stop 22 may comprise a radially inwardly extending rim or narrowing of the ball receptacle 18 at or near an extreme radially outward end of the ball receptacle 18.

Each ball plunger probe 16 may also include a biasing element such as a coil spring 20 carried within the receptacle 18 and disposed between the ball 14 and a radial inner end 19 of the ball plunger receptacle 18 as shown in FIG. 4. The biasing element 20 may be configured to bias the ball 14 radially outwardly toward the extended position and into contact with either the outer stop 22 or an inner circumferential wall 17 of an engagement portion 19 of a hole 15 to be measured.

Each ball plunger probe 16 may also include a ball engagement detector as shown at 24 in FIG. 4. The ball engagement detector 24 is positioned and configured to detect depression or radially inward movement of the ball 14 from the extended position and to generate a corresponding signal.

Each ball plunger probe 16 may alternatively be configured to generate a signal in response to non-depression. In other words, each probe 16 of the array may be configured to generate a signal either in response to contact or non-contact with an inner wall 17 of the engagement portion 19 of the hole 15 to be measured. In either case the corresponding signal may be in any suitable form to include either an opened or closed electrical circuit or an increase, decrease, or shut off signal power output. Each signal may include, for example, simply closing or opening a circuit and/or may include an increase, decrease, and/or loss of signal power.

The apparatus may include a controller 26 configured to calculate the grip length of the engagement portion 19 of the hole 15 in response to signals received from the probes 16 and to generate a corresponding grip length measurement signal. The controller 26 may include, for example, an electrical circuit, an electronic circuit or chip, and/or a computer.

Although not separately shown, where the controller 26 includes a computer, the controller generally may include a processor, memory that may be coupled to the processor, and one or more interfaces coupling the controller to one or more other devices. Although not shown, the controller 26 and other powered system devices may be supplied with electricity by a relatively low voltage power supply, which may consist of one or more batteries, fuel cells, or the like.

Where the controller 26 includes a processor, the controller processor may execute instructions that provide at least some of the functionality for the apparatus. As used in this description, the term "instructions" may include, for example, control logic, computer software and/or firmware, programmable instructions, or other suitable instructions. Where the controller 26 includes a processor, the processor may include, for example, one or more microprocessors, microcontrollers, application specific integrated circuits, programmable logic devices, field programmable gate arrays, and/or any other suitable type of electronic processing device(s).

Also, where the controller 26 includes memory, the memory may be configured to provide storage for data received by or loaded to the controller, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the controller 26 interfaces may include, for example, analog/digital or digital/analog converters, signal conditioners, amplifiers, filters, other electronic devices or software modules, and/or any other suitable interfaces. The interfaces may conform to, for example, an RS-232, parallel, small computer system interface, universal serial bus, and/or any other suitable protocol(s). The interfaces may include circuits, software, firmware, or any other device capable of assisting or enabling the controller in communicating with other devices.

As shown in FIG. 4, the apparatus 10 may include a transmitter 28 connected to the controller 26 and configured to transmit the grip length measurement signal to a remote device 30, such as a computer used by a 3D optical projection system in directing the placement of an appropriately sized fastener in the panel stack hole 15. The transmitter 28 may be a wireless transmitter to obviate the need for a wired connection to the remote device 30.

The controller 26 may be configured to measure the grip length of the engagement portion 19 of a hole 15 by ascertaining which probes 16 are contacting the inner wall 17 of the engagement portion of the hole 15 to be measured. The controller 26 may be configured or programmed to do this by ascertaining the distance between a forward edge of a near-side stop surface 32 of the apparatus, and the probe 16 that's farthest from the near-side stop surface and in contact with the inner wall 17 of the hole 15. Thus, a single grip length measurement apparatus 10 can be used to measure the grip length of a hole 15 having no nut plate 23 or other far-end obstruction present.

The near-side stop surface 32 of the shaft 12 may be shaped and positioned to engage a countersunk portion 21 (countersink) of the hole 15 to be measured as shown in FIG. 6, and all the probes 16 of the probe array may be disposed forward of the near-side stop surface 32. Once the shaft 12 has been inserted into a hole 15 to be measured and the near-side stop surface engages the countersink 21 the hole 15 as shown in FIG. 6, the grip length of the hole 15 may calculated as the distance along the shaft 12 between the near-side stop surface 32 and the farthest forward actuated probe 16. This arrangement will cause the countersink 21 depth to be neglected in the grip length measurement. The near-side stop surface 32 may be a frusto-conical outer surface of a "flared" portion of the shaft 12, and may be formed into the shape of a fastener head that the countersink 21 is shaped to receive. The near-side stop surface 32 may be formed on a frusto-conical nut 34 that may be threadedly engaged on a threaded portion 35 of the shaft 12 so that the axial position of the nut 34 can be adjusted to "zero" the apparatus for taking measurements with the stop surface 32 engaged in a countersink 21.

The controller 26 may be configured, e.g., programmed, to determine the grip length of a hole 15 by ascertaining the distance between a distal forward end 36 of the shaft 12, and the probe 16 that's both farthest aft from the distal forward end of the shaft and that's contacting an inner wall 17 of the hole 15. This allows grip length measurements to be made in situations where, as shown in FIG. 5, an obstruction such as a nut plate 23 is blocking the distal forward end 36 of the shaft 12 from passing beyond a far end of the hole 15 to be measured. A plug 37 may be threadedly engaged in a hole 38 formed into the distal forward end 36 of the shaft 12 so that the axial position of the plug 37 can be adjusted to "zero" the apparatus for taking measurements with the plug 37 engaged against an obstruction 23.

The controller 26 may be configured, e.g., programmed, to determine the grip length of a hole 15 by ascertaining the distance between the probes 16 that are spaced farthest apart axially from one another while contacting an inner wall 17 of a hole—regardless of the axial position of the shaft 12 within a hole being measured. As shown in FIG. 7, neither the forward end 36 of the shaft 12 nor the near-side stop surface 32 need be engaged. This enables a single grip length measurement apparatus 10 to measure the grip length of a hole 15 regardless of the presence of a far-end obstruction, such as a nut plate 23, or the presence of a countersink 21, and regardless of whether a distal end 36 of the shaft 12, a forward guard portion of the handle, or any other near-side stop surface of the apparatus is engaged against a facing surface of a plate stack 11, 13 through which the hole 15 extends.

Figure 8:
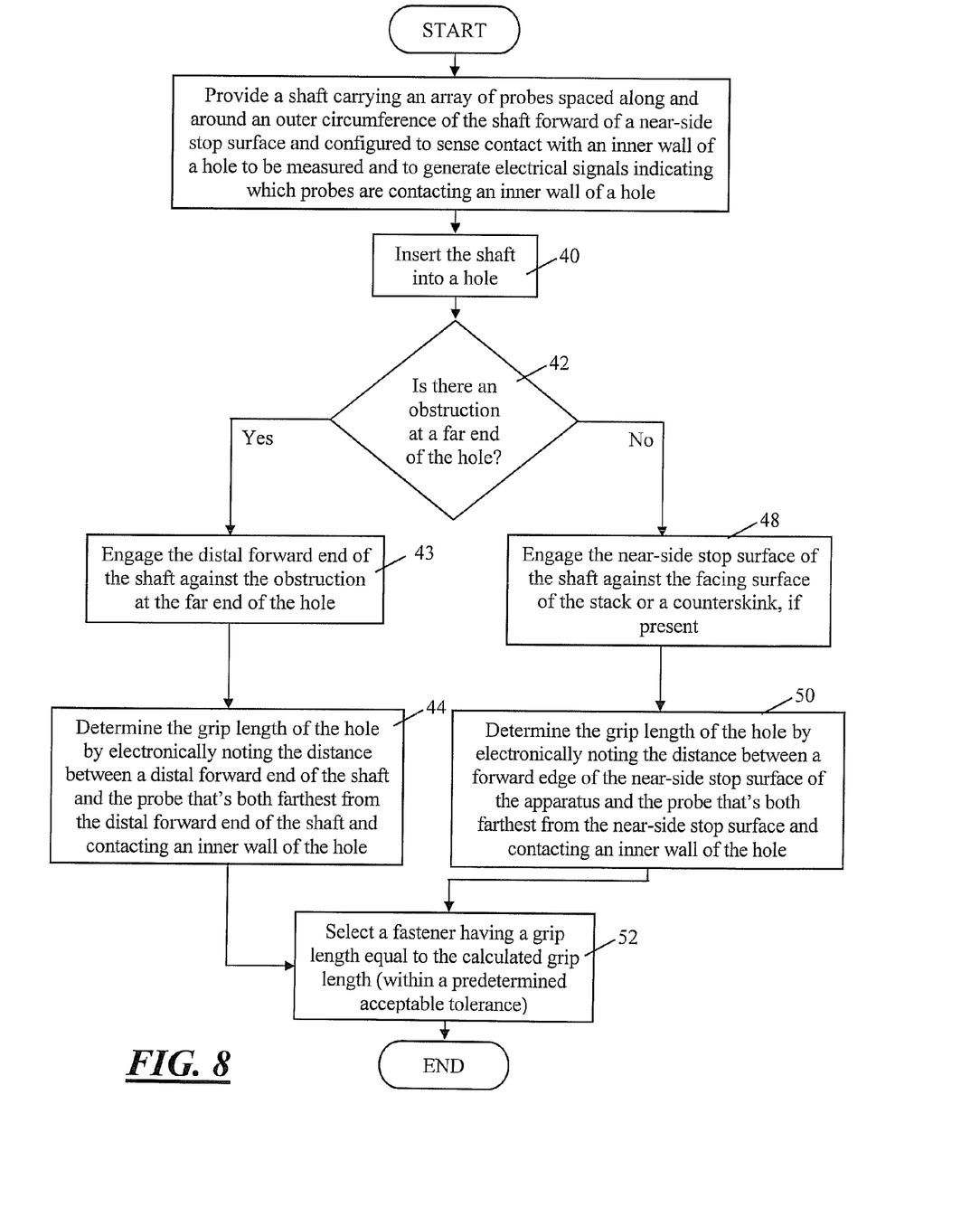
FIG. 8 is a flow chart showing a method for determining the grip length of a hole.
Figure 9:
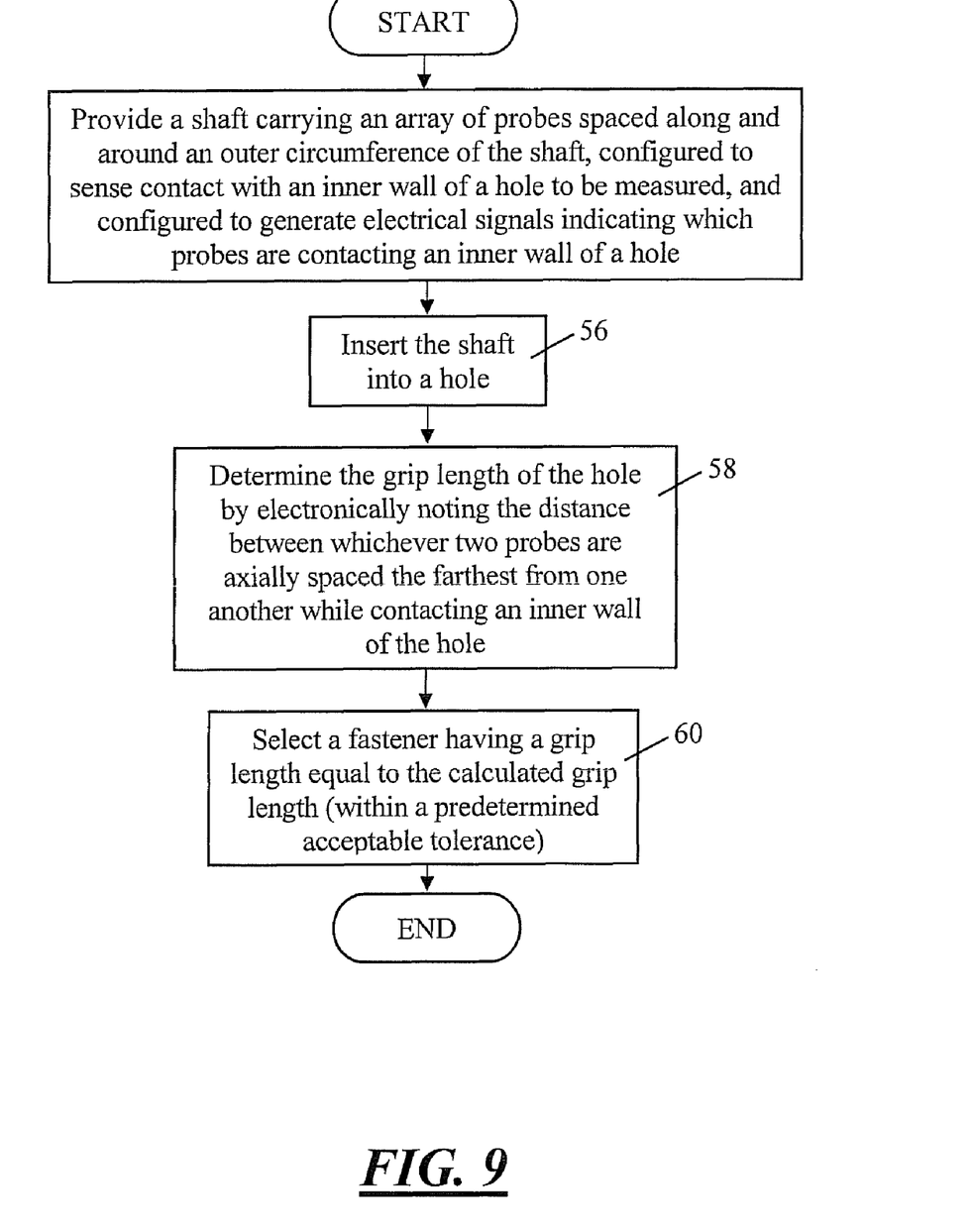
FIG. 9 is a flow chart showing an alternative method for determining the grip length of a hole.

In practice, as shown in the drawings of FIGS. 5-7, and as indicated in the method flow charts of FIGS. 8 and 9, the grip length of a hole 15 can be determined by inserting the shaft 12 into a hole 15 to be measured (as shown in action step 40 of FIG. 8 and action step 56 of FIG. 9) and measuring a grip length of the hole in response to signals received from the probe 16 array.

The hole 15 to be measured may first be checked for the presence of an obstruction such as a nut plate 23 at a far end of the hole 15 as indicated in decision step 42 of FIG. 8. Where, as shown in FIG. 5, such an obstacle is determined to be present, the grip length of the hole 15 may be determined by first engaging the distal forward end 36 of the shaft against the obstruction 23 at the far end of the hole 15 as indicated in action step 43 of FIG. 8, and then ascertaining the distance between a distal forward end 36 of the shaft 12 and the probe 16 that's both farthest from the distal forward end 23 of the shaft 12 and in contact with an inner wall 17 of the hole 15, as indicated in action step 44 of FIG. 8.

Where, as shown in FIG. 6, no such obstruction is determined to be present at the far end of the hole 15, the grip length of the hole may be determined by first ensuring that the near-side stop surface 32 of the shaft is fully engaged either with facing surface 33 of the stack of panels 11, 13, or within the hole's countersink 21 (if a countersink is present) as shown in FIG. 6 and as indicated in action step 48 of FIG. 8. As indicated in action step 50, the distance between a forward edge of the near-side stop surface 32 of the shaft 12 and the probe 16 that is both farthest from the near-side stop surface and contacting the inner wall 17 of the hole may then be electronically noted. Once the grip length of a hole 15 has been determined, a fastener having a grip length equal to the calculated grip length (within a predetermined acceptable tolerance) may be selected as is indicated by action step 52.

Referring to the drawing of FIG. 7 and the method flow chart of FIG. 9, the grip length of a hole 15 may be determined, regardless of the presence of a far side obstruction 23 or a countersink 21, by first inserting the shaft 12 into a hole 15 as indicated in action step 56 of FIG. 9. As indicated in action step 58 of FIG. 9, the distance between whichever two probes 16 are both contacting an inner wall 17 of the hole and, at the same time, are axially spaced the farthest from one another, may be electronically noted. Once the grip length of a hole 15 has been determined, a fastener having a grip length equal to the calculated grip length (within a predetermined acceptable tolerance) may be selected, as indicated in action step 60 of FIG. 9.

This hole grip length measurement system allows for simpler, faster measurement of hole grip lengths without requiring multiple motions for actuation. The described measurement apparatus is far less likely to get stuck or hung-up in a hole than a pinch-style device, can be used despite the presence of far-side hole obstructions, and is able to correct for the presence of countersinks.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A hole grip length measurement apparatus comprising:
   a shaft configured to be inserted into a hole to be measured;
   an array of probes spaced along the shaft, one or more probes of the array being configured to sense contact with an inner wall of a hole to be measured, the array being configured to generate one or more signals indicating which probes of the array are contacting an inner wall of a hole into which the shaft has been inserted; and
   a controller configured to calculate the grip length of a hole in response to signals received from the probes and to generate a corresponding grip length measurement signal.

2. A hole grip length measurement apparatus as defined in claim 1 in which the probes are spaced around the shaft and extend radially outward from the shaft a distance sufficient to maintain one another in contact with an inner wall of a hole to be measured.

3. A hole grip length measurement apparatus as defined in claim 2 in which the shaft and probe array are sized diametrically to contact and bias outward against an inner wall of a hole to be measured.

4. A hole grip length measurement apparatus as defined in claim 1 in which the probes comprise ball plungers.

5. A hole grip length measurement apparatus as defined in claim 4 in which each ball plunger probe includes:
   a ball carried by a ball receptacle that is configured to support generally radial reciprocal motion of the ball relative to a central longitudinal axis of the shaft between an extended position against an outer stop where at least a portion of the ball protrudes radially outwardly from an outer wall of the shaft; and
   a biasing element carried by the ball receptacle and configured to bias the ball radially outwardly toward the extended position; and
   a ball engagement detector configured to detect depression or radially inward movement of the ball from the extended position and to generate a corresponding signal.

6. A hole grip length measurement apparatus as defined in claim 1 in which the apparatus includes a transmitter connected to the controller and configured to transmit the grip length measurement signal to a remote device.

7. A hole grip length measurement apparatus as defined in claim 6 in which the transmitter is a wireless transmitter.

8. A hole grip length measurement apparatus as defined in claim 1 in which the controller is configured to measure the grip length of a hole by ascertaining which probes are contacting an inner wall of a hole to be measured.

9. A hole grip length measurement apparatus as defined in claim 8 in which the controller is configured to determine the grip length of a hole by ascertaining the distance between a forward edge of a near-side stop surface of the apparatus and the farthest probe contacting an inner wall of the hole.

10. A hole grip length measurement apparatus as defined in claim 9 in which the near-side stop surface is shaped and positioned to engage a countersink of a hole to be measured, and all the probes of the probe array are disposed forward of the near-side stop surface.

11. A hole grip length measurement apparatus as defined in claim 8 in which the controller is configured to determine the grip length of a hole by ascertaining the distance between a distal forward end of the shaft and the farthest probe contacting an inner wall of the hole.

12. A hole grip length measurement apparatus as defined in claim 8 in which the controller is configured to determine the grip length of a hole by ascertaining the distance between the farthest-spaced probes contacting an inner wall of a hole.

13. A method for determining the grip length of a hole, the method including the steps of:
providing an array of probes carried by and spaced along a length of a shaft, each probe of the array being configured to sense contact with an inner wall of a hole to be measured, the array being configured to generate one or more signals indicating which probes of the array are contacting an inner wall of a hole into which the shaft has been inserted;
inserting the shaft into a hole to be measured; and
calculating a grip length of the hole in response to signals received from the array.

14. The method of claim 13 including the additional step of selecting a fastener having the calculated grip length to within a predetermined acceptable tolerance.

15. The method of claim 13 in which the step of providing an array of probes includes spacing the probes around the shaft.

16. The method of claim 13 in which the step of calculating a grip length of the hole includes ascertaining the distance between a forward edge of a near-side stop surface of the apparatus and the farthest forward probe that's contacting an inner wall of the hole.

17. The method of claim 13 in which the step of calculating a grip length of the hole includes ascertaining the distance between a distal forward end of the shaft and the farthest aft probe that's contacting an inner wall of the hole.

18. The method of claim 13 in which the step of calculating a grip length of the hole in response to signals received from the array includes determining the grip length of a hole by ascertaining the distance between whichever two probes are axially spaced the farthest from one another and are contacting an inner wall of the hole.

* * * * *